(No Model.)
H. W. LEAVITT.
LUBRICATOR.
No. 587,264. Patented July 27, 1897.
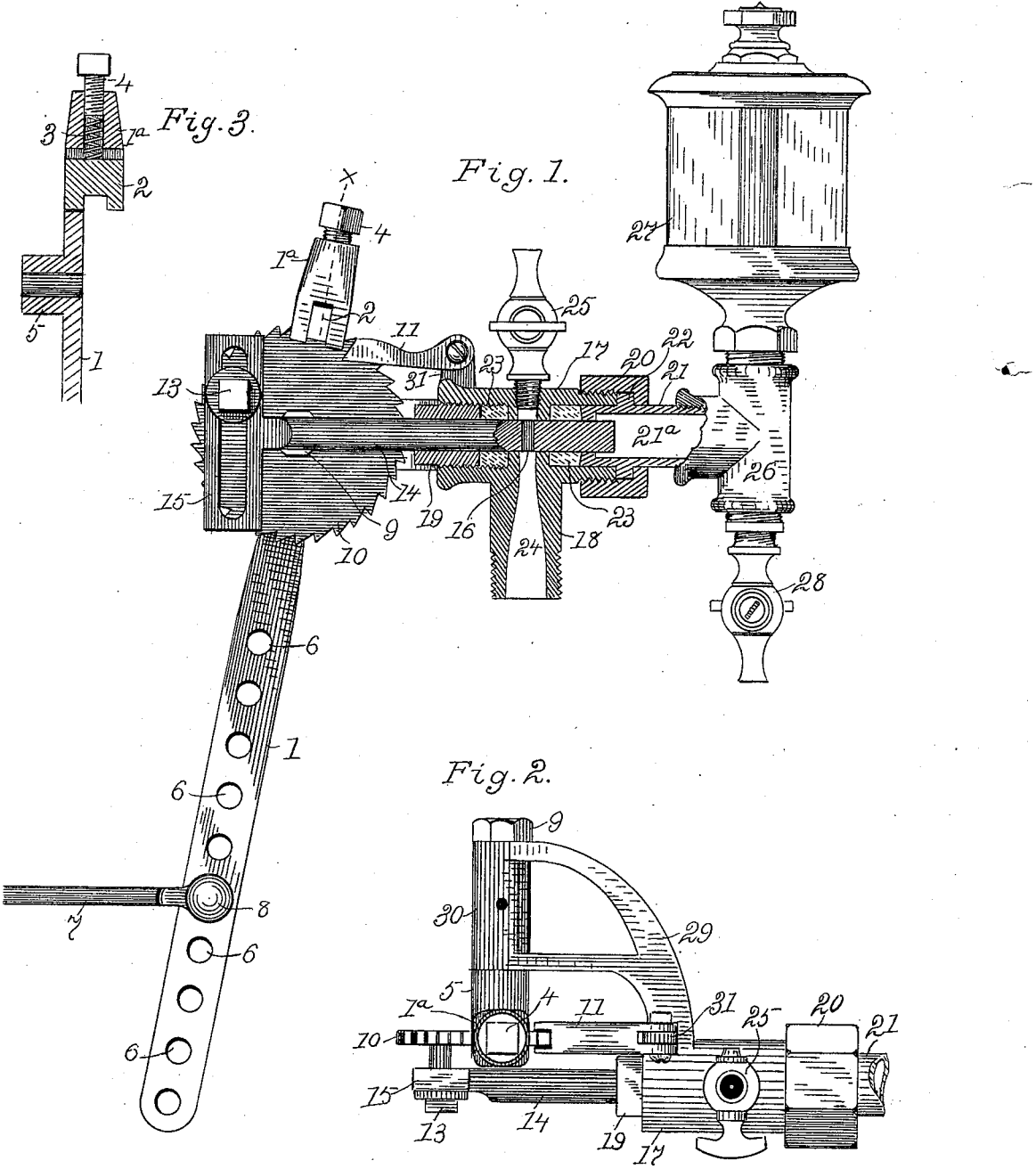
Attest.
Nora Graham
Ina Graham
Inventor
Harry W. Leavitt
by L. P. Graham
his attorney

UNITED STATES PATENT OFFICE.

HARRY W. LEAVITT, OF HAMMOND, ILLINOIS.

LUBRICATOR.

SPECIFICATION forming part of Letters Patent No. 587,264, dated July 27, 1897.

Application filed January 18, 1897. Serial No. 619,614. (No model.)

*To all whom it may concern:*

Be it known that I, HARRY W. LEAVITT, of Hammond, in the county of Piatt and State of Illinois, have invented certain new and useful Improvements in Lubricators, of which the following is a specification.

This invention is designed to provide accurate and positive means for supplying oil to bearings in quantities proportionate to the extent of wearing motion. It is particularly applicable to the lubricating of the internal working surfaces of engines. It is exemplified in the structure hereinafter described, and it is defined in the appended claims.

In the drawings forming part of this specification, Figure 1 is a side elevation of my improvement, showing certain working parts in central vertical section. Fig. 2 is a plan of the operative parts of the device. Fig. 3 is a section on line X in Fig. 1.

In constructing a lubricator in accordance with my invention I prefer to connect a T-section of pipe with the lower or discharge end of an oil-cup in such manner that the head of the T shall stand vertical and the leg shall lie in a horizontal position. This arrangement is shown in Fig. 1 of the drawings, where the oil-cup is designated by 27 and the T-section by 26. To the lower end of the head of the T-section is connected a petcock 28 for a purpose to be hereinafter explained. A section of pipe 21 is made with one end exteriorly threaded, the opposite end contracted, and with a fixed collar or annular rib 22 formed on its outer surface near the contracted end. An interiorly-threaded collar-nut 20 is made of proper size to slip over pipe 21 and rib 22, and after it is in position on the pipe the pipe is screwed into the horizontal member of the T-section 26. A cylinder 17 is made with its bore contracted for a short distance at the center thereof, and it is supplied with a leg extension 18, that is bored at 24 to communicate with the contracted portion of the bore of the cylinder. One end of the cylinder is interiorly threaded. The other end is exteriorly threaded, and the projecting end of the leg 18 is exteriorly threaded. The exteriorly-threaded end of the cylinder is slipped over the contracted end of the section of pipe 21 and is held thereon in a horizontal position by means of the collar-nut 20. A petcock 25 is screwed into the cylinder in line with the bore of the leg, and a packing-plug 19 is screwed into the extended end of the cylinder. A piston-rod 14 is made with a diameter equal to the bore of the packing-plug, the contracted part of the bore of the cylinder, and the contracted end of pipe 21, and it has a transverse hole 16 and a slotted cross-head 15. It is inserted through the cylinder and into the cavity 21$^a$, formed by the enlarged bore of pipe 21, and its slotted cross-head provides means whereby it may be given a reciprocating motion. A bracket 29 extends from a side of the cylinder beyond the extended end thereof, and it has a tubular bearing portion 30, lying at right angles with the piston-bore of the cylinder. A bolt 9 extends through the bearing 30, and it forms a journal for a ratchet-wheel 10 and for the hub 5 of a rock-arm 1. The ratchet-wheel has a crank-pin 13, which engages the slot of the cross-head of the piston, and the head 1$^a$ of the rock-arm has a pawl 2, that engages the teeth of the ratchet-wheel. The pawl 2 is adapted to slide in a slot in the head of the rock-arm. It is formed to straddle the ratchet-wheel, and it is held to its work by pressure of spring 3. The tension of the spring against the pawl is regulated by set-screw 4, which is screwed into the head of the rock-arm and against the upper end of the spring. A detent 11 is pivoted at one end on a standard 31, which rises from bracket 29, and its swinging end engages the ratchet-wheel and prevents back motion therein. The long end of the rock-arm has a set of holes, as 6, at intervals along its length, and a reciprocating rod 7 is connected with the arm by means of a bolt 8, which extends through the end of the rod and through one of the holes in the arm, the arm being forked to better provide for such connection.

As hereinbefore stated, the lubricator is particularly designed for oiling the internal wearing-surfaces of engines, and in such cases the leg 18 is connected with the pipe that supplies steam to the valve-chest of the engine, and the rod 7 is connected, preferably at least, with the valve-stem of the engine.

The enlargement 21$^a$ of pipe 21 forms a reservoir to which the lubricant is supplied from the oil-cup by force of gravity. The motion of the piston-rod is sufficient to carry the hole 16 into the reservoir at one extreme of the throw of the rod and to bring it in line with the bore 24 of leg 18 at the other extreme of the throw, so that at each complete rotation of the ratchet-wheel the hole of the piston-rod receives oil from the reservoir and discharges it through the leg and the steam-pipe into the steam-chest.

The ratchet-wheel has in this instance thirty-six teeth, and in the ordinary operation of the device oil is discharged into the leg once to every thirty-six back-and-forth motions of the valve-stem. This proportion is not arbitrary, however, and it may be varied to suit different circumstances by changing the number of teeth in the wheel, or, rather, by using different wheels having different numbers of teeth. In addition to this, the speed of the piston may be proportionately doubled by connecting the rod 7 so near the fulcrum of arm 1 that sufficient oscillation will be developed in the arm to cause the pawl to ride over two teeth at each throw of the rod. When the proportionate rapidity of feed is properly established, either as above stated or by any other means, it will thereafter be uniformly maintained, so many drops of lubricant being supplied in so many movements of the valve-stem or other moving member of the engine or machine to which the lubricator may be attached.

The means employed to reciprocate the piston-rod are peculiarly adapted for the purpose, as the piston is given a comparatively quick motion from the reservoir to the outlet-bore and back again, and remains practically stationary for some little time at the extremes of the throws. This enables the hole to properly fill with oil while in the reservoir and to completely empty while in the outlet-bore. In the particular instance illustrated the travel from the reservoir to the outlet and the reverse is made in about twelve oscillations of the rock-arm, leaving the piston practically stationary during six oscillations of the arm.

The piston-rod is shaped to snugly fit its metallic bearings, and to make the closure still more effective packing may be introduced, as suggested at 23 in Fig. 1.

In case it should be desirable to demonstrate that the hole in the piston is not clogged the petcock 25 may be opened, and if by any possibility the passage of oil should be to any extent impeded the hole will be completely cleaned by the passage of the steam. The cock 28 permits the discharge of any water of condensation that may accumulate in the reservoir as a result of leakage, and should there be any sediment in the oil such sediment may be collected in the cock and discharged.

As in the preferred use of the device the piston works in contact with live steam, it will be readily seen that the operation will be as reliable in cold weather as in warm.

Having thus described the essential characteristics of my invention and also explained the manner in which I prefer to construct it, I claim as new and desire to secure by Letters Patent—

1. In a lubricator, the combination of a pipe communicating with an oil-cup and having a contracted outlet and an annular outer rib, a cylinder having a lateral outlet-opening, a collar-nut bearing against the rib of the pipe and connecting the cylinder with the pipe, and a piston-rod having motion through the cylinder and into the pipe, such piston-rod having a transverse hole adapted to convey oil from the pipe to the outlet of the cylinder.

2. In a lubricator, the combination of a horizontal cylinder having an oil-reservoir and a lateral outlet-opening adapted to communicate with a steam-pipe, a piston-rod in the cylinder having a transverse hole adapted to carry oil from the reservoir to the outlet, and a cock in the cylinder in alinement with the outlet, substantially as set forth.

In testimony whereof I sign my name in the presence of two subscribing witnesses.

HARRY W. LEAVITT.

Attest:
  J. R. PONDER,
  F. W. TAYLOR.